United States Patent [19]
Cardoza et al.

[11] Patent Number: 5,924,122
[45] Date of Patent: Jul. 13, 1999

[54] METHOD FOR ERROR RECOVERY SPINLOCK IN ASYMMETRICALLY ACCESSED MULTIPROCESSOR SHARED MEMORY

[75] Inventors: Wayne M. Cardoza, Amherst; Kathleen D. Morse, Hollis, both of N.H.; Richard B. Gillett, Jr., Westford; Charles Kaufman, Northboro, both of Mass.

[73] Assignee: Compaq Computer Corp., Houston, Tex.

[21] Appl. No.: 08/818,757

[22] Filed: Mar. 14, 1997

[51] Int. Cl.⁶ ........................................ G06F 12/16
[52] U.S. Cl. ................ 711/150; 395/800.28; 395/185.01
[58] Field of Search .................. 395/800.28, 800.29, 395/800.3, 800.31, 200.75, 200.76, 200.31, 200.43, 200.44, 182.13, 182.05, 185.01; 711/147, 150, 151

[56] References Cited

U.S. PATENT DOCUMENTS

| | | | |
|---|---|---|---|
| 5,129,093 | 7/1992 | Muramatsu et al. | 395/800.28 |
| 5,193,181 | 3/1993 | Barlow et al. | 395/181 |
| 5,630,166 | 5/1997 | Gamache et al. | 395/800.29 |
| 5,729,749 | 3/1998 | Ito | 711/150 |
| 5,761,731 | 6/1998 | Van Doren et al. | 711/147 |

OTHER PUBLICATIONS

Wang et al., *Priority Inheritance Spin Locks for Multiprocessor Real–Time Systems*, Parallel Architectures, Algorithms, and Networks, 1996 Symposium, IEEE, Jun. 12–14, 1996.

Anderson, Thomas E., *The Performance of Spin Lock Alternatives for Shared–Memory Multiprocessors*, IEEE Transactions on Parallel and Distributed Systems, IEEE, vol. 1, No. 1, Jan. 1990.

*Primary Examiner*—Richard L. Ellis
*Attorney, Agent, or Firm*—Ronald L. Chichester; Paul N. Katz; Frohwitter

[57] ABSTRACT

An error recovery method and apparatus has specific application in a networking arrangement having a plurality of individual processing nodes which communicate via shared memory space. For error recovery, the system uses a reliable error count, the value of which is maintained by all of the nodes. When an error is detected, the error count is incremented, and all of the active nodes are provided with the new error count. Any of the nodes can run the error recovery method, and may gain exclusive access to the network by acquiring an error recovery spinlock. Once the spinlock is acquired, the node holding the spinlock increments the error count and confirms that all active nodes have received the new error count. The spinlock is thereafter released.

17 Claims, 11 Drawing Sheets

METHOD FOR ERROR RECOVERY SPINLOCK IN ASYMMETRICALLY ACCESSED MULTIPROCESSOR SHARED MEMORY

FIELD OF THE INVENTION

This invention relates generally to the field of parallel computing and, more particularly, to a networking arrangement which provides high-speed communication between a number of individual processing nodes.

DESCRIPTION OF THE RELATED ART

Large scale parallel computers have historically been constructed with specialized processors and customized interconnects. The cost of building specialized processors in terms of components and time to market caused many computer manufacturers to re-evaluate system designs. Currently, many vendors in the market are attempting to provide performance similar to that of custom designs using standard processors and standard networks. These are generally marketed and sold as clustered computer systems.

By using standard components and networks, clustered systems have the advantage of providing a parallel computing system having a much lower cost design at a decreased time to market. However, because the standard network protocol is used, a communication overhead is incurred that translates into poor overall parallel system performance.

The source of much of the performance loss associated with standard networks arises because the currently existing network hardware is incapable of guaranteeing message delivery and order. Because these guarantees are not provided by network hardware, software solutions are required to detect and handle errors incurred during message transmission.

Network software typically comprises many layers of protocol. These network layers are executed by the operating system and work together in an attempt to detect dropped messages, transmission errors and to recover from the above events, as well as others. Because the operating system is linked to the network software, there is no provision for direct access by a given application program to the network. Accordingly, because there is no direct link between the application program and the network, performance is further reduced due to the overhead of the network software interface.

One method for providing high performance communication is described in U.S. Pat. No. 4,991,079, entitled "Real-Time Data Processing System," to Dann et al. The Dann et al. patent describes a write-only reflective memory system that provides a form of networking better suited for parallel computing than standard networks. This system is referred to as a "write-only reflective memory data link." The reflective memory system includes a real-time data processing system in which each of a series of processing nodes is provided with its own data store partitioned into a local section and a section which is to be shared between the nodes. The nodes are interconnected by a data link. Whenever a node writes to an address in the shared portion of the data store, the written data is communicated (i.e. reflected) to all of the nodes via the data link. The data in each address of the shared data store can only be changed by one of the nodes which has been designated as a master node for the corresponding address. Because each address containing shared data can only be written to by one node, collisions between different nodes attempting to change a common item of data cannot occur.

The Dann et al. system, although it describes a method for providing high performance parallel computing, provides no mechanism for ensuring recoverable communication. It would be desirable to have a high performance parallel computing system which also had a fast and simple form of error recovery. It would also be desirable to have an error recovery system which provided an easy interface for application programs being run on the system.

SUMMARY OF THE INVENTION

The present invention relates to a shared memory system such as that known as Memory Channel™ (MC), which is a product of the Digital Equipment Corporation, Maynard, Mass. More specifically, the present invention provides an error recovery protocol for the MC which is simple, reliable and easy to interface with by applications being run on the MC.

The MC consists of a plurality of independent processing nodes and a central hub to which each of the nodes is connected. The nodes each have both a local memory space and a shared memory space. The local memory provides for the necessary local storage area of the node, and is not accessible by the other nodes of the system. The shared memory space is a mapped address region which is common to all the nodes, and which provides a link for network communication between the nodes. Provided with the MC hardware are a number of communication commands, including those which allow polling of the nodes, That is, any node can write a particular command to the shared memory space, and receive an acknowledgment from all the other nodes which are not disabled.

The error recovery protocol of the present invention is run by any one of the nodes of the MC. In order to avoid conflicts in different nodes attempting to implement the error recovery, a spinlock is used which ensures that only one node at a time has exclusive access to the network resources needed for error recovery (i.e. holds the "lock"). Preferably, this includes controlling particular memory locations which must be modified during the recovery process, and having the exclusive right to run the error recovery program. Each node has a table showing the "lock status" of each the nodes. The lock status is a stored indication of which, if any, of the nodes has acquired, or is attempting to acquire, the error recovery spinlock. When a node is attempting to acquire the spinlock, it changes its lock status, and writes the new lock status to the shared memory, such that it is received by all non-disabled nodes, and used to update the lock status table of each. Once the spinlock is acquired by a node, the error recovery routine may be executed.

The basis for the error recovery of the present invention is the control of an error counter. The error count is maintained at each of the nodes. At any time there is an error on the network, the node experiencing the error writes an incremented value for the error count to the shared memory. This new error count is received by each node. The identification of an error also causes the nodes to stop transmitting any data slated for transmission, and to refuse to receive any data slated for receipt. Thus, no corrupt data is stored in memory and, because the nodes "freeze up," there are no "holes" in the received data stream (i.e. no data that is being received during the error is reconstructed with portions of it missing). As long as the integrity of the error count value can be maintained, applications running on the MC have a simple and reliable basis for determining what data transfers must be reexecuted in order to recover from the error.

The error recovery process run by a node detecting the error has three stages, acquisition of the spinlock, incrementing of the error count, and release of the spinlock. To acquire the spinlock the node executing the operation (i.e. the "first" node) checks its own lock status table. If the table indicates that any other node has attempted to acquire the spinlock, the other nodes are polled to determine whether all of the nodes identified as not being disabled are still responding to the polling and are not in an error state. If so, the first node continues to check the lock states and poll the other nodes. If another node which is responsive and not in an error state continues to assert a lock state which indicates that it holds the lock for longer than a predetermined time period, it is assumed that the node is hung up, and the first node attempts to disable it. If the attempt fails, the first node crashes. If it is successful, the first node resumes checking the lock states and, if necessary, polling the other nodes.

If, after polling the other nodes, it is determined that another node is in an error state, or is nonresponsive, the MC hardware is polled to determine whether that node has been declared disabled. If so, the first node's list of disabled nodes is updated, and it continues by returning to the checking of the lock status table. If the other node has not been declared disabled, the error state check is repeated for a predetermined period of time. If, after the time period expires, the other node is still reporting an error, or is nonresponsive, and has not been declared disabled by the MC hardware, the first node attempts to disable the other node. If this attempt is successful, the first node returns to checking the lock status table. If the attempt is unsuccessful, the first node crashes.

If the first node determines that lock status of all other, non-disabled nodes indicates that no other node is attempting to acquire the spinlock, it changes its own lock status to indicate that it is attempting to attain the spinlock, and writes this to the MC. This write is one which requires an acknowledgment from any node receiving it, and the first node waits for all the responses from the other nodes. If all the nodes do not respond within a first predetermined time, the first node attempts to determine whether any nodes have been disabled and, if so, updates its list of disabled nodes. If, after a second predetermined time non-responding nodes still exist which do not appear to be disabled, the first node attempts to disable the non-responsive node. If the attempt is successful, it again checks the lock status of the other nodes. If the attempt is unsuccesful, the first node crashes.

If all of the non-disabled nodes respond and indicate that they have not acquired, and are not attempting to acquire, the spinlock, the first node is determined to hold the spinlock. If any of the other nodes indicates that it is attempting to acquire the spinlock, the first node examines the priority level of the other node (according to a predetermined hierarchy assigned to the nodes). If the competing node has priority over the first node, the first node writes a new lock status to the MC, this time indicating that it is not attempting to acquire the lock. The first node then returns to waiting and polling the lock status of the other nodes. If the competing node does not have priority, the first node again writes its lock status to the MC as indicating that it is attempting to acquire the spinlock, and continues polling the other nodes waiting for the competing node to discontinue its attempt to acquire the spinlock.

Once the first node confirms that its holding of the spinlock is acknowledged by the other nodes, it reads the value of the error count, and increments it (ignoring the sign bit of the error count). It then sets the sign bit of the incremented error count, and writes the new value to the shared memory space as a new error count. The first node then polls the other nodes to determine whether they all received the new value as the error count. If all the other nodes identified as not being disabled do not respond, the first node (as described above for the spinlock acquisition routine) attempts to update its list of disabled nodes and, if all nodes listed as not disabled do not ultimately respond, the first node crashes.

If the first node receives acknowledgment from all other nodes of having received the new value for the error count, it then clears its own hardware error status, performs any necessary software error processing and writes the incremented value of the error count (with the sign bit clear) to the MC as the new error count. The first node then again polls the other nodes to determine whether all non-disabled nodes received the new error count. If all other nodes identified as non-disabled acknowledge receipt, this stage of the error recovery process is complete. If not, the first node (as before) continues to poll the other nodes, attempting to update its list of disabled nodes, and eventually crashing if any node listed as non-disabled fails to respond within a predetermined time.

If the first node successfully increments the error count in the MC, the spinlock must then be released. The firstnode updates its lock status to indicate that it no longer holds, or is attempting to hold, the spinlock, and writes the new lock status to the other nodes via the shared memory of the MC. The first node waits for an acknowledgment from the other nodes and, if all nodes identified as non-disabled respond, the lock is declared to be free and the program terminates. If any of the nodes believed to be non-disabled do not respond, the first node makes several more attempts to write the new lock status and receive the appropriate acknowledgment, before the non-responding nodes are declared disabled and the program terminates.

DETAILED DESCRIPTION OF PREFERRED EMBODIMENTS

Figure 1:
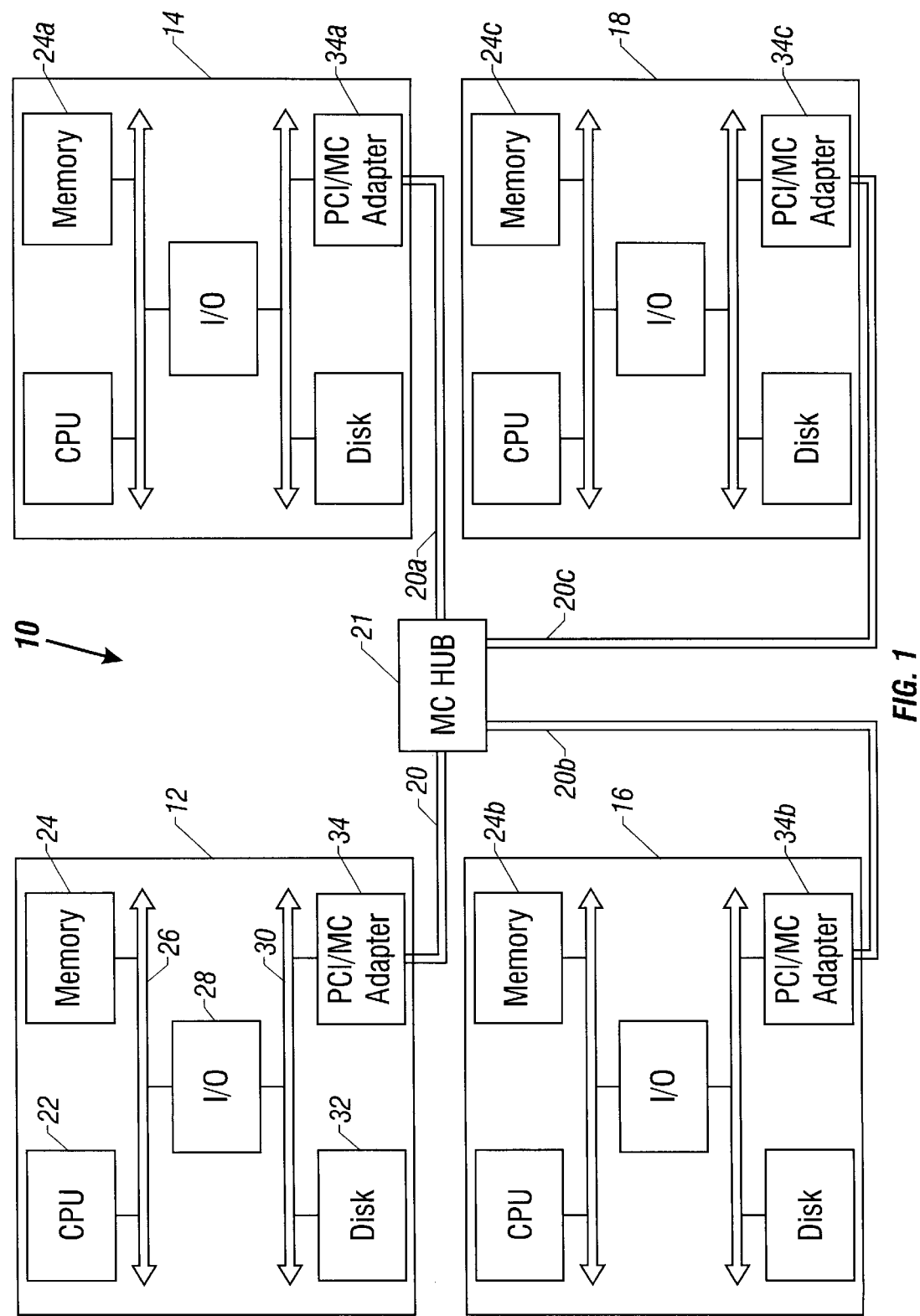
FIG. 1 is a block diagram of a shared network of processing nodes according to the present invention.

Referring now to FIG. 1, a Memory Channel™ (MC) network 10 of processing systems is shown to include a plurality of nodes 12, 14, 16, and 18, each coupled via a high speed network data link 20, 20a, 20b, and 20c, respectively to a MC Hub 21. The high speed data link is here a twisted-pair industry-standard cable, 3 meters in length, which links PCI-MC adapters of each of the nodes to the MC Hub 21. The MC Hub 21 is an eight port Memory Channel Hub, and links the nodes 12, 14, 16, 18 of the network. Although each of the nodes 12, 14, 16 and 18 have been shown having identical internal components, it is to be understood that each node may be configured differently within the constraints of the invention as described herein. In addition, it should be understood that each node may include more than one processor, system bus and I/O devices controlled by one operating system.

Each processor node, for example node 12, includes a central processing unit (CPU) 22 and a memory 24 coupled to a local bus 26. An Input/Output (I/O) interface 28 is also coupled to the local bus 26. The I/O interface 28 is used to couple external devices that are coupled to a bus 30 to the node memory 24 and central processing unit 22. The bus 30 is here a high performance bus operating according to the Peripheral Chip Interface (PCI)™ bus protocol, and is hereafter referred to as the PCI bus 30. The PCI bus 30 is capable of transmitting data at a rate of up to 132 Mbytes/second.

A plurality of external devices may be coupled to the PCI bus 30, such as disk device 32, a printer interface (not shown), or a network interface (not shown). Also coupled to the PCI bus 30 is a PCI to Memory Channel (MC) adapter 34. The PCI to MC adapter 34 is used to interface the node 12 to the other nodes 14, 16, and 18 in the network 10 through the use of a memory mapped network protocol. Each of the PCI to MC adapters 34, 34a, 34b, and 34c are coupled to MC Hub 21, which provides for interconnectivity between each of the nodes. Basically, the MC Hub 21 can be thought of as a backplane, or connector. Such an arrangement allows each of the nodes to communicate with other nodes in the Memory Channel network 10 as described below. It should be noted that the MC adapters may alternatively be coupled directly to the system bus 26, with a small change in the operational functionality described below. However, for purposed of clarity, only the embodiment of the invention illustrated in FIG. 1 will be described.

Each of node memories 24, 24a, 24b and 24c is apportioned into at least two distinct address spaces. One address space of node memory is used to store data that is accessed only by the associated node, that is hereinafter referred to as the local memory. The second portion is used to store data that may be accessed by any node in the network. The second portion is hereinafter referred to as the Memory-Channel (MC) address space.

Figure 2:
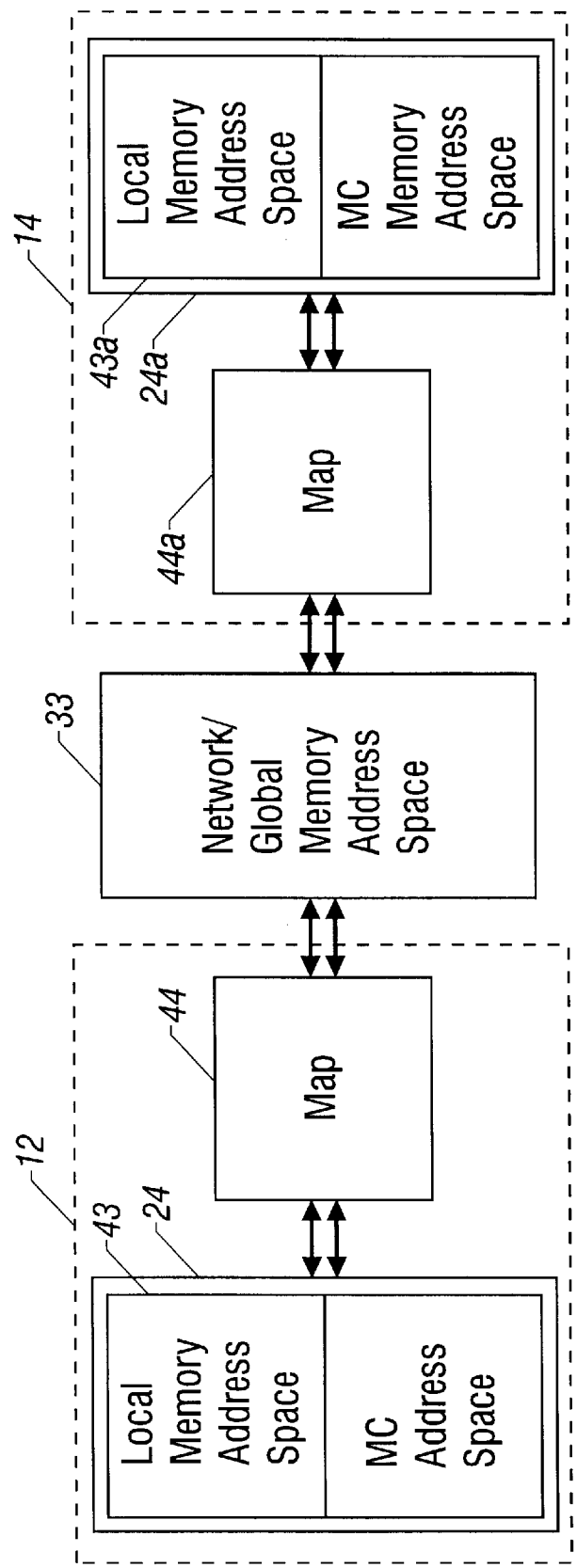
FIG. 2 is a block diagram illustrating a shared memory aspect of the network of FIG. 1.

Referring now to FIG. 2, the two memory address spaces of memories 43 and 43a of nodes 12 and 14, are here shown as discrete entities for illustrative purposes. It should be noted that, although the memory spaces are shown as discrete memory blocks, the memory spaces may comprise many interspersed sub spaces. The nodes 12 and 14 are outlined by dashed lines to indicate that not all of the elements of the node are shown. In addition, a network address space 33 in shown, where the network address space represents an addressable portion of memory which is to be shared by all of the nodes within the network. Coupled between each of the address spaces 43 and 43a and the network address space 33 are maps 44 and 44a respectively. Each map is used to translate node memory addresses into network addresses of network address space 33.

For example, writes to the shared portion of memory address space 43 are translated by map 44 to an address in network address space. The network address is translated by map 44a in node 14 to an address of the node memory of node 14. Accordingly, node 12 communicates with node 14 via writes its own MC address space. Similarly, writes to the shared portion of memory address space 43a by node 14 are translated by map 44a to an address in network address space 33. The network address is translated by map 44 of node 12 into a node memory address for node 12. Such an arrangement allows for communication between the CPU or external I/O devices of node 12 and the CPU or external I/O device of node 14 by providing memory-mapped connections which are established between the nodes.

Each node controls if, when, and where it exposes its MC address space to the network address space. This ability to isolate addresses is the basis for recovery from node failures; only a portion of the address space of the local node can be affected by the node failure.

Each node creates a mapped connection with other nodes at any point during operation as required by the application in a manner which will be described further below. The connection is advantageously controlled by the operating system of each node in order to assure protection and maintain security in the network. The overhead associated with creating the mapped connection is much higher than the cost of using the connection. Thus, once the connection is established it can be directly used by kernel and user processes. All that is required is that the MC address be mapped into the virtual space of the process. Thus the cost of transmitting data, in the terms of complexity, is as low as the cost of a memory operation.

Although FIG. 2 illustrates communication between two nodes, it should be understood that the present invention allows for communication between many nodes coupled together via a common data link while maintaining data coherency and consistency.

Figure 3:
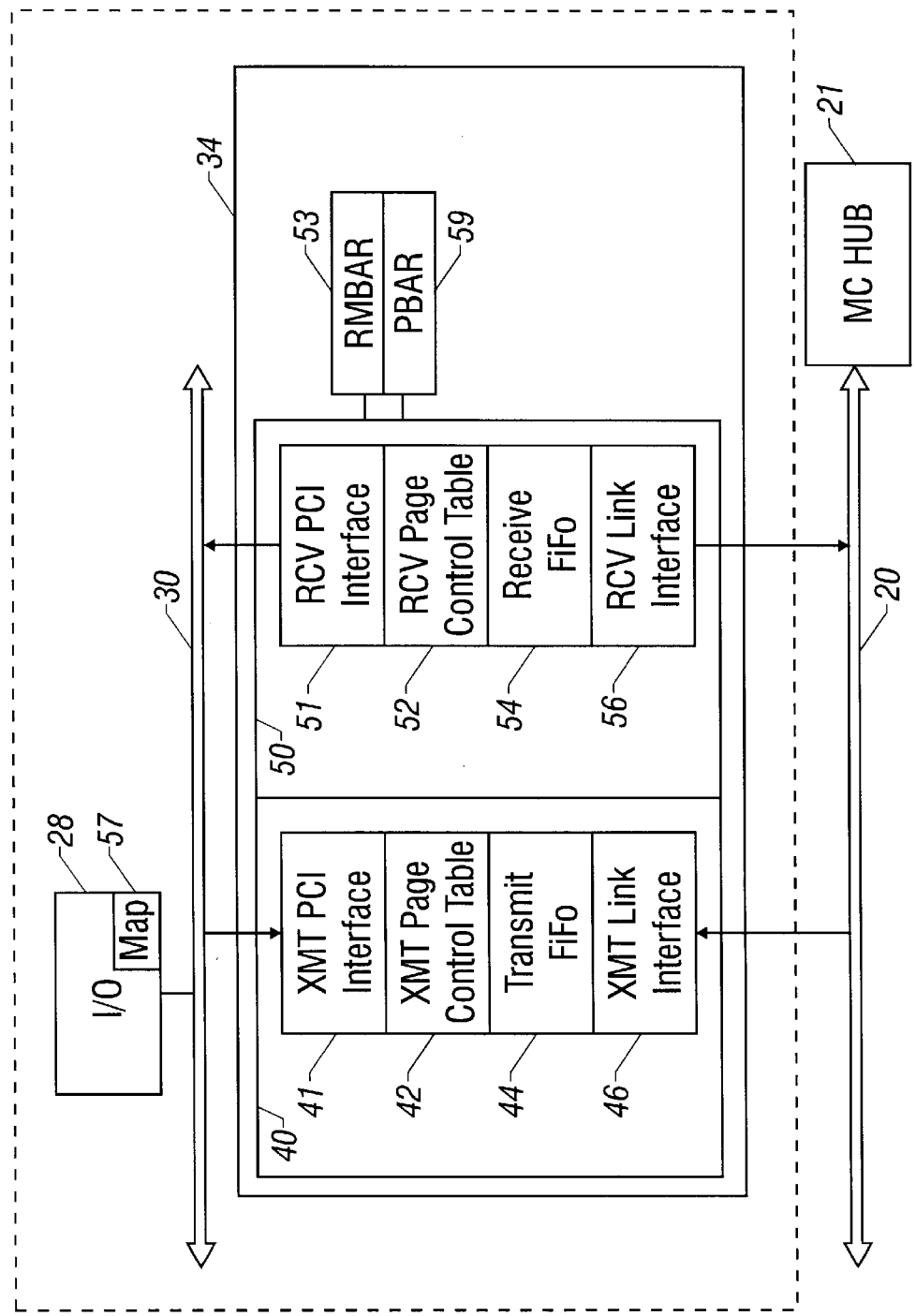
FIG. 3 is a block diagram illustrating a data transfer apparatus which may be used by the nodes of the network of FIG. 1.

Referring now to FIG. 3, the components of the PCI to MC adapter are shown in greater detail. Although for purposes of clarity a 'MAP' element 44 was shown in FIG. 2, it is noted that in this embodiment the mapping functionality is divided into two distinct portions; one map portion for a transmit path 40 of the adapter and one map portion for a receive path 50 of the adapter.

In the transmit path 40, the PCI to MC adapter includes a PCI interface 41, for translating local PCI space addresses into addresses for network address space 33 (FIG. 2). The transmit path also includes a Transmit Page control table 42. The transmit control table comprises an entry for each address page, wherein each entry has a number of control bits for indicating how the corresponding pages are to be transmitted over data link 20. The transmit path 40 also includes a transmit FIFO 44, which is a buffer operating under a first-in first-out design and is used to store pending write requests to data link 20. A transmit link interface 46 is an interface for controlling data transmission over the data link 20.

The transmit control entry for each page of data being transmitted over the bus dictates transmission characteristics of the data in the following manner. The transmit control bits include a Destination Node ID field, a Broadcast field, a MC-Transmit Enable field, a Loopback field, a Generate Acknowledge (ACK) field, and a Suppress Transmit After Error (STAE) field. The transmit control page table bits operate in general as follows, where the terminology 'set' is meant to indicate the active state of field, which will result in the described result. The Destination Node ID field indicates which node in the network is to receive the data that is written to the corresponding page of MC address space. When the Broadcast field is set, every write to the corresponding page of MC address space is sent to all nodes in the network. When the Loopback field is set, every write to the corresponding page of MC address space will result in a return write to the node that initially issued the write command. When the generate ACK field is set, any write made to the corresponding page of MC address space, that is issued to another node on the network, requires the recipient node to return an acknowledgment that it has received that data from the sending node. This acknowledgement includes an indication of whether or not the responding node is in a hardware error state. When the Suppress Transmit After Error (STAE) bit is set, any write to the corresponding page of MC address space from a node that has detected an error at some point during the transmission of the data to another node in the network, will stop transmission once it has detected the error.

The receive path 50 includes a receive line interface 56, for controlling data reception from data link 20. The receive path also includes a receive FIFO 54, operating under a first-in first-out protocol for buffering received writes from a data link 20 until they are able to be handled by the PCI interface 51. The receive FIFO 54 is coupled to provide received data to the Receive page control table 52. The receive page control table 52 includes control bits for each address page, where the control bits dictate the action to be taken by the node when received data is to be written to a corresponding page. The Receive page control table and the Receive FIFO are coupled to a Receive PCI interface 51, which drives data onto PCI bus 30.

The general functionality of the receive page control bits are as follows. When the MC-Receive Enable (REN) field is set, any writes received by a node from the network to that page of the MC address space may be accepted into the receive FIFO of the node provided it is a write destined for that particular node. When the REN field is not set, then writes to the node are not accepted into the receive FIFO. When the Interrupt After Write bit is set, the MC adapter of the receiving node, after receiving the write data, will cause an interrupt signal to be set to interrupt the processing of the CPU at the node. When the Suppress Receive After Error (SRAE) bit is set, if an error occurs during the receipt of a write from the cluster, the MC adapter at the receiving node will stop accepting data to pages for which this bit is set.

The PCI to MC adapter also includes a MC base address register 53. The MC base address register 53 is initialized by software, and indicates the base address of the network address to be provided over data link 20. This base address is used to translate the PCI address to a network address that is common to all of the nodes in the network. The PCI to MC adapter also includes a PCI base address register 59. The received MC address from data link 20 is added to the contents of the PCI base address register to form a PCI address for transmission onto PCI bus 30. This PCI address then either accesses other I/O devices or is translated via a memory map 57 in I/O interface 28 to form a physical address for accessing memory 24 (FIG. 1).

During operation, when a node seeks to write to the shared, MC address space, the loopback bit is set in the transmit page control table, and a write instruction is transferred through the transmit portion of the MC adapter, and transmitted over the data link. The receive portion 50 of the MC adapter then retrieves this write from the data link and stores it in the receive FIFO for transfer through the I/O interface into the MC address space. This loopback method for writing to shared, MC address space ensures that each node receives updates to MC address space in order and at substantially the same time (give or take delays in the I/O device resulting from other external I/O requests).

By providing a network address space that is common to all of the nodes in a cluster, a mechanism is provided that allows for sharing of data and communication between processes on different nodes without the complexity of the local area network protocol. Rather, during operation the protocol is virtually invisible to the nodes in the network because the writes to network address space appear as simple writes to memory. Because elaborate protocols are not required for communication, some mechanism is required to ensure the transmissions between nodes are made correctly and that data shared by the nodes in the network remains coherent. A technique that allows nodes in the network to have either shared or exclusive access to data structures is described in detail below.

Access to data in the shared MC address space is often controlled through use of a "spinlock." Spinlock is a term used to describe a flag which is used to determine which of the nodes 12, 14, 16, 18 owns the data, i.e., which node can modify it. The flag is a data cell which is shared by each of the nodes. If the data cell is set to a logic "0", any one of the nodes can access the cell, set it to a logic "1", and thereby be given control of the associated data. That node can thereafter write to the data cell freely. When the spinlock data cell is set to logic "1", the nodes not having control of the data are said to be "locked out," and must wait (or "spin") until control once again becomes available. When the controlling node completes its modifications, it resets the error spinlock data cell to a logic "0 ", once again making control available to all the nodes.

To identify errors, the MC system makes use of a variable "errcnt" which is the current number of MC errors which have occurred throughout the network since the system was last reinitialized. Applications may check this value and, if it changes while the application is operating, it is assumed that an error has occurred. The application thereafter waits, and repeatedly checks to see if the error recovery is complete. When it is, the application repeats the appropriate operation.

Because any of the nodes may run the error recovery routine, the value of errcnt is protected in the system by a unique form of spinlock referred to as the "error recovery spinlock." Before running the error recovery routine, a node must first acquire the error recovery spinlock, and after the error recovery routine is complete, the node must release the spinlock. The error recovery spinlock makes use of a special data structure that consists of a single hardware acknowledgment structure for each node. Each of the nodes shares a single page of MC address space, and each has a page of physical memory on their own respective node, all of the pages having the same corresponding data elements. Each page has an acknowledgment region for each of the nodes. The page is marked "loopback" and "acknowledgment." Each node writes its "lock status" to the last four bytes of its acknowledgment region on the page. These last four bytes should always contain a zero or one, zero being the normal (or idle) state, and one indicating that the node has acquired, or is attempting to acquire, the lock. When a node writes its lock status to the last four bytes of its acknowledgment region, it gets back acknowledgments ("acks") from the other nodes when they see the lock status write. Each node returns its ack in the byte corresponding to its node identification. The page is specifically not set to lockup on transmit or receive errors.

Errcnt is also implemented as one page of MC address space and one page of physical memory one each node. The page is marked loopback and acknowledgment on all nodes. The page is mapped into the space of all "applications" for them to look at the error count. The page is used like the error lock pages in that the node writing to it only writes to the last four bytes of the first MC block and then waits for acks to come back in the remaining bytes of the block. In the preferred embodiment, the errcnt page is shared with the error spinlock page.

Figure 4A:
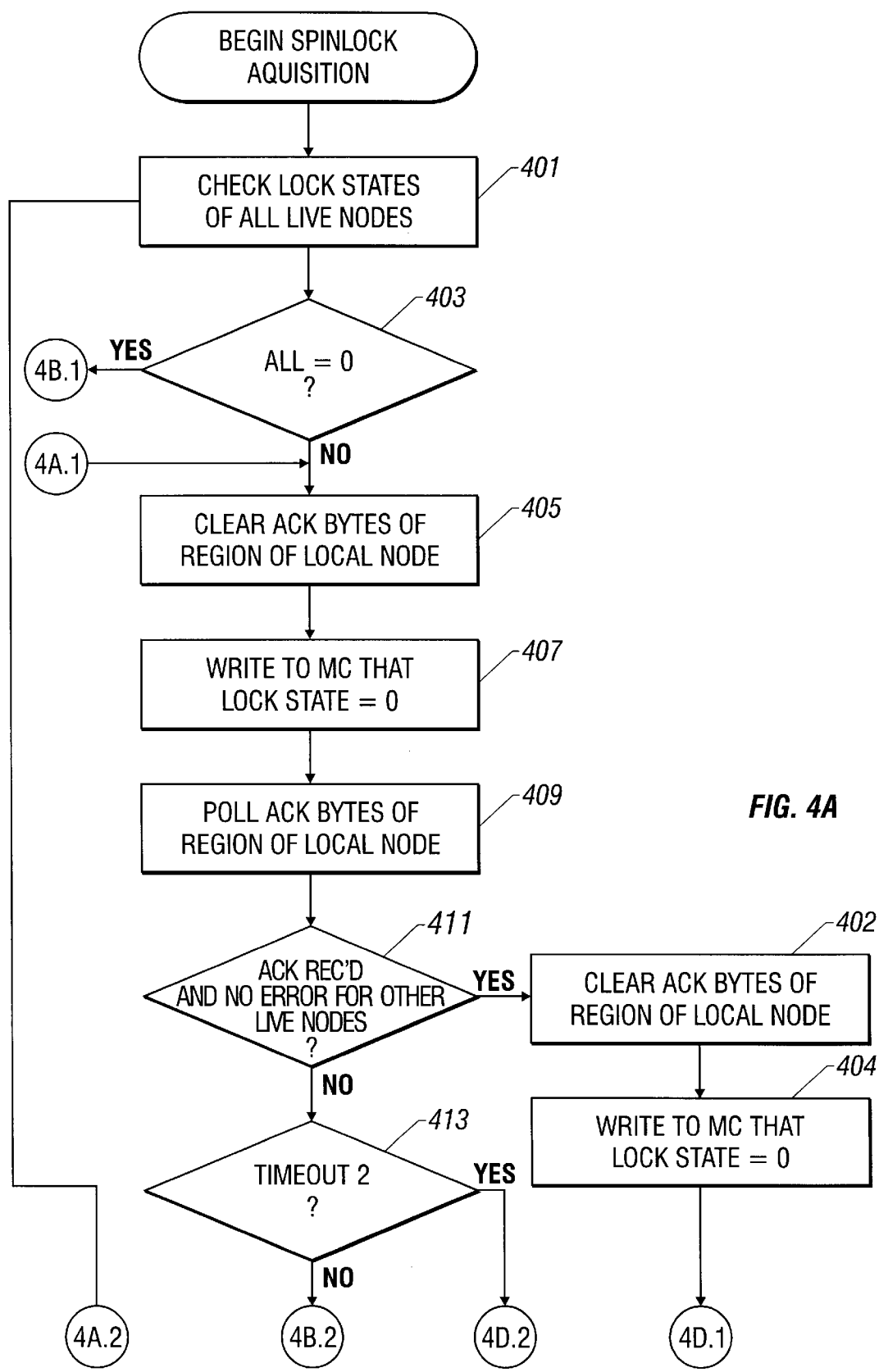
FIG. 4A is a flowchart demonstrating an embodiment of the error recovery spinlock acquisition program according to the present invention.
Figure 4B:
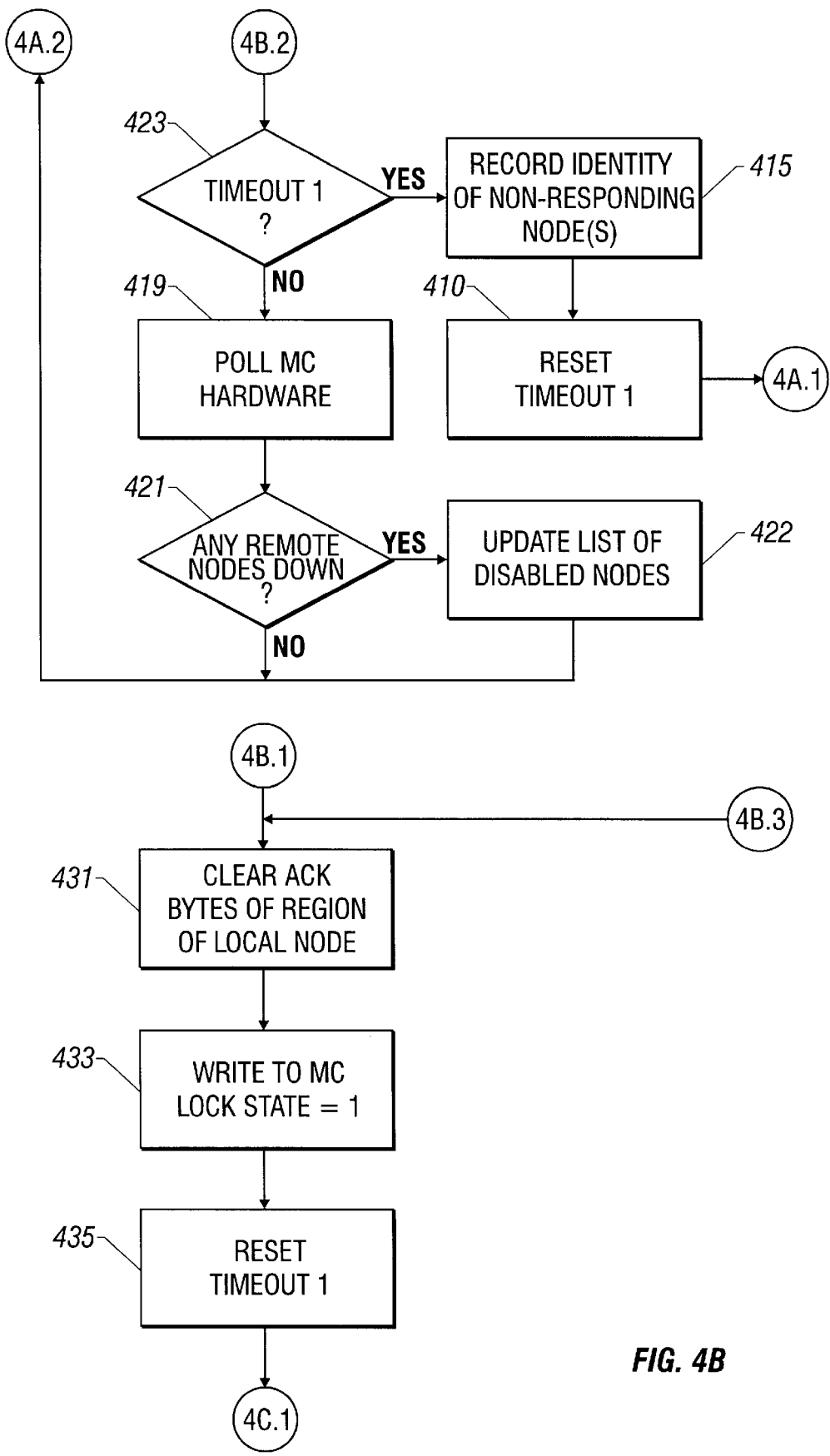
FIG. 4B is a flowchart demonstrating an embodiment of the error recovery spinlock acquisition program according to the present invention.
Figure 4C:
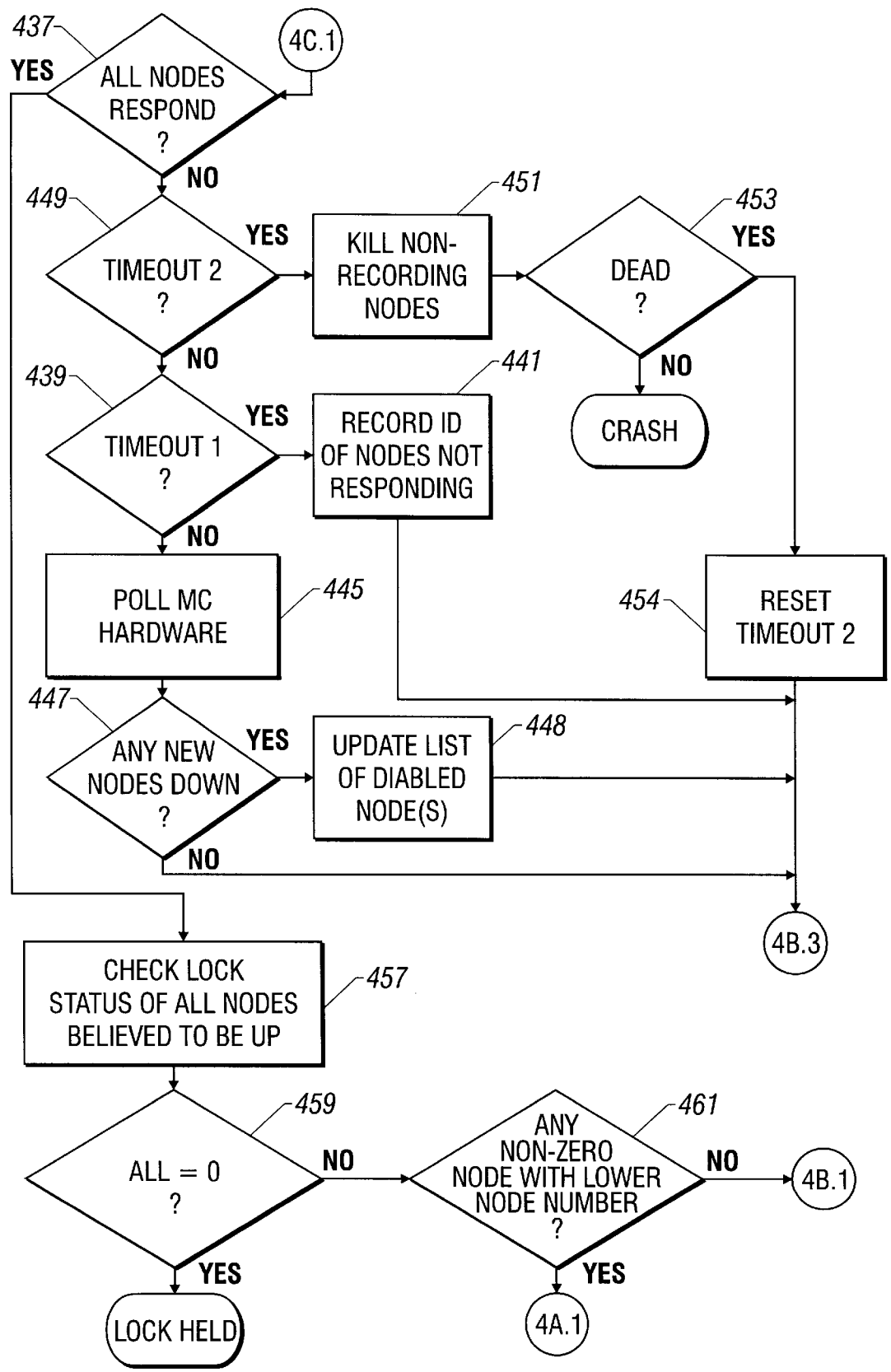
FIG. 4C is a flowchart demonstrating an embodiment of the error recovery spinlock acquisition program according to the present invention.

The acquisition of an error recovery spinlock is depicted in the flowchart of FIGS. 4A–4C. Two timers, "timeout1" and "timeout2," have been previously initialized, and are used selectively, as described below. The node attempting to acquire the lock first checks the lock states of the all the nodes which are believed to be not disabled, as shown in step 401 of FIG. 4A. The check of the lock states is done by examining the last four bytes of the node acknowledgment regions of all nodes, as represented in its own local memory. If all have a zero value (step 403), it is presumed that the lock is available, and the routine proceeds to step 431 (discussed further hereinafter). If there are non-zero values present, the routine advances to step 405, where all of the ack bytes of the ack region for the node in local memory are cleared. The node then writes, via the MC, that its lock status is equal to zero (step 407). Polling of the ack bytes is then performed (step 409) and the node checks to determine whether an acknowledgment has been received for each of the other nodes believed to still be functional, and whether those nodes are in an error state (step 411).

If any of the nodes fail to respond, or are indicated as being in an error state, and neither of two timers "timeout1" and "timeout2" has expired, the program proceeds to step 419 (FIG. 4B), where the MC hardware is polled to find out whether any of the nodes have been reported as disabled or "down". This "polling" consists of making a request to the MC hub 21 to report on all on-line nodes, an operation supported by the MC hardware. If any of the nodes are reported disabled, the record of which nodes are believed to be disabled is updated (step 422), and control returns to step 401 (FIG. 4A). Timer "timeout1" has the shorter duration of the two timers, and is used to detect nodes not responding to the polling of the ack bytes. If timeout1 expires in step 423 (FIG. 4B), the identities of the nodes which did not respond are recorded in step 415. Timeout1 is then reset in step 410, and the routine returns to step 405 (FIG. 4A).

Figure 4D:
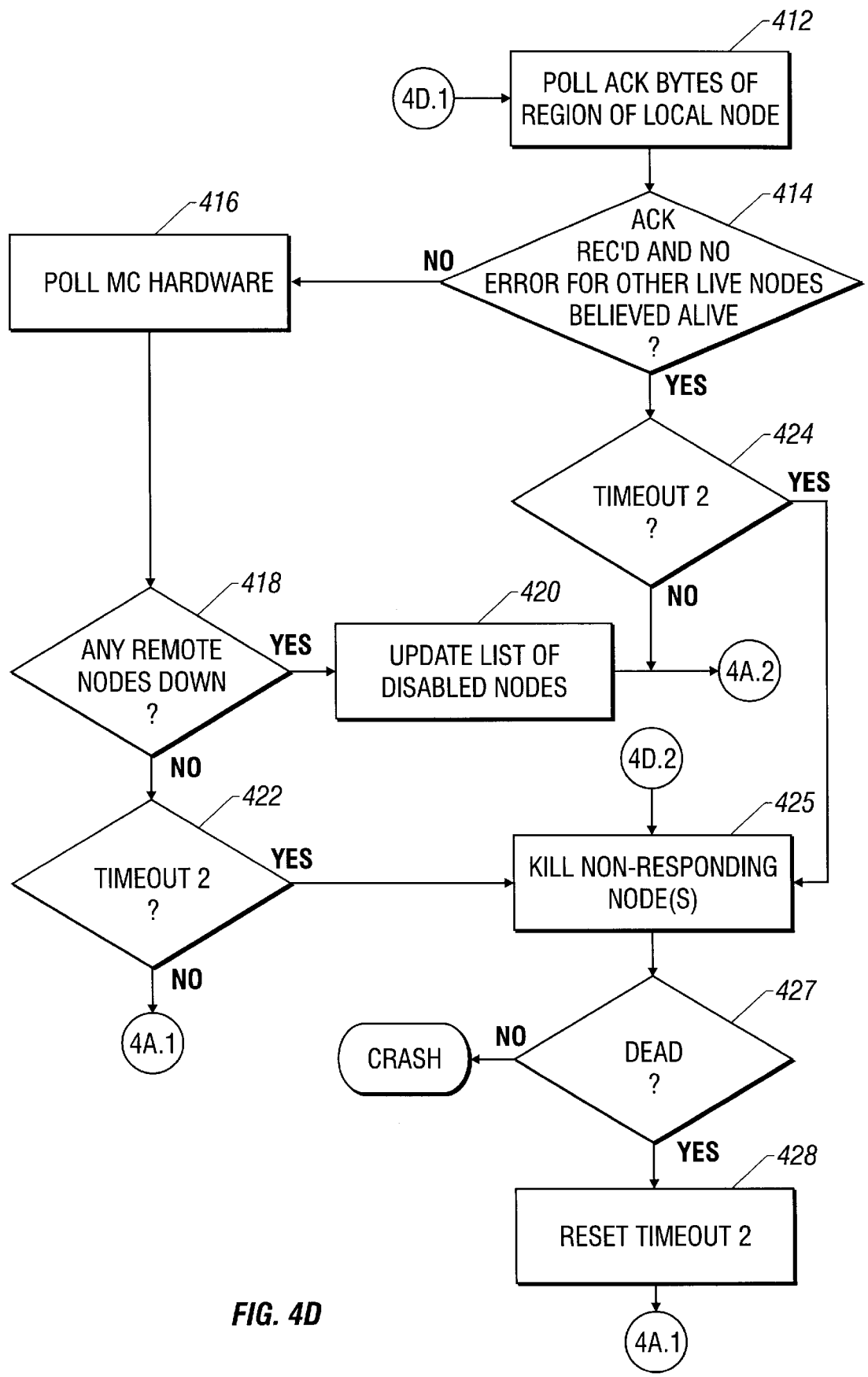
FIG. 4D is a flowchart demonstrating an embodiment of the error recovery spinlock acquisition program according to the present invention.

Timer "timeout2" is the longer of the two timers, and is intended to detect a node which holds the spinlock, but which is hung-up and not making progress. If timeout2 expires (step 413), the node running the error lock acquisition process attempts to bring down the node or nodes which have repeatedly failed to respond (or which still show an error state) by writing to the "MC suicide" address of each in step 425 (FIG. 4D). Writing to this address will ordinarily cause the node to crash, and allow the MC hardware to identify the fact that the node is disabled. In step 427, the node again checks to see if the non-reporting node is disabled by polling the MC hardware, as in step 421. If no additional nodes are reported down, the local node crashes. If any additional node is reported down, timeout2 is reset in step 428, and control returns to step 405 (FIG. 4A).

If, in step 411, ack bytes have been received from each of the other nodes believed to be functional, and none of these are indicated as being in an error state, the ack bytes of the ack region of the local node are cleared in step 402. The node then writes, via the MC, that its lock status is equal to zero (step 404). The ack bytes of the ack region of the local node are then polled in step 412 (FIG. 4D). If an acknowledgement is received from all of the other nodes believed to be functional, and those nodes are not indicated as being in an error state (step 414), timeout2 is checked (step 424) and, if it hasn't expired, control returns to step 401. If timeout2 has expired in step 424, control passes to step 425, where the program continues as described above. If, in step 414, any of the nodes believed functional do not respond to the acknowledgement polling, or are in an error state, the MC hardware is polled in step 416 to determine whether any additional nodes have been reported as disabled. If any additional nodes are reported down (step 418), the local node's list of disabled nodes is updated in step 420, and control returns to step 401 (FIG. 4A). If no other nodes have been listed as disabled, timeout2 is checked in step 422. If timeout2 has not expired, control returns to step 405 (FIG. 4A). If timeout2 has expired in step 422, control passes to step 425, and the routine continues as described above.

Referring again to step 403 (FIG. 4A), If all of the nodes believed to be functional eventually report a lock status of zero, the acquisition routine progresses to step 431 (FIG. 4B), where all of the ack bytes of the region belonging to the local node are cleared. The node running the acquisition routine then writes, via the MC, its lock state to be equal to one (step 433). In step 435, timeout1 is reset, and in step 437 (FIG. 4C) the node checks to see if all of the nodes believed to be functional responded to the write it issued. If so, the acquisition routine proceeds to step 457, discussed hereinafter. If any of the nodes believed to be functional do not respond in step 437, and neither timeout1 nor timeout2 has expired, the MC hardware is polled in step 445, and the reply is checked by the present node to determine whether any nodes have been recently identified as being down (step 447). If the information returning from the test of step 447 indicates that any nodes not previously recognized as being down are now indicated as being down, the local node updates its list of disabled nodes (step 448), and control is returned to step 431 (FIG. 4B). If no new nodes are indicated as being down in step 447, control returns to step 431 without any update.

If timeout1 expires while waiting for a response in step 439 (FIG. 4C), the identity of the nodes not responding is recorded in step 441, and the routine returns to step 431. If timeout2 expires (step 449), the local node attempts to "kill" any nodes which have repeatedly failed to respond (or which still show an error state) by writing to the MC suicide page of each (step 451), as described above with regard to step 425. The status of the node is then checked in step 453 by polling the MC hardware, and if the non-responding node is disabled, timeout2 is reset in step 454, and control returns to step 431. If the status of the node is not reported back as disabled, the node running the program crashes.

The result of all the nodes eventually responding in step 437 is that the lock status of all the nodes believed to be functional is once again checked in step 457. If all the other nodes report back with a lock status of zero (step 459), the lock is determined to have been positively acquired, and the routine ends. If any of the other nodes report back with a non-zero lock status, the reporting nodes are checked in step 461 to determine whether any of them have a lower node number (a relative priority value assigned to each of the nodes). If any of them have a lower node number, it indicates that they have a higher priority in attempts to acquire an error spinlock, and the routine therefore returns to step 405 (FIG. 4A). If the node numbers of the node or nodes reporting back a non-zero lock status is higher than that of the local node, it is assumed that the local node has a higher priority, and control returns to step 431 (FIG. 4B).

The above-described routine allows a local node to establish control of the error spinlock for the purpose of running the desired error recovery program. Most pages in the system should be marked "lock up" on transmit errors or on receive errors (with several exceptions, including the errcnt pages and the lock status pages). That is, the SRAE and STAE fields are set for these pages. This helps make errors "safe," that is, if no writes get transmitted following a transmit error, and nothing is received following a receive error, it looks like the MC simply delayed all the traffic so nothing can immediately be corrupted. However, before the error can be reset, it is necessary to make sure that every node that could have missed out on the data trying to be written has its errcnt set to a value greater than any value of errcnt that was read by any application before the error occurred, and that the value of errcnt on the local node (i.e. the node running the recovery procedure) is higher than that which any application could have seen before the error.

Once the error spinlock is established, the local node may then run the error recovery protocol. A preferred version of this protocol is shown in FIGS. 5A–5C.

Figure 5A:
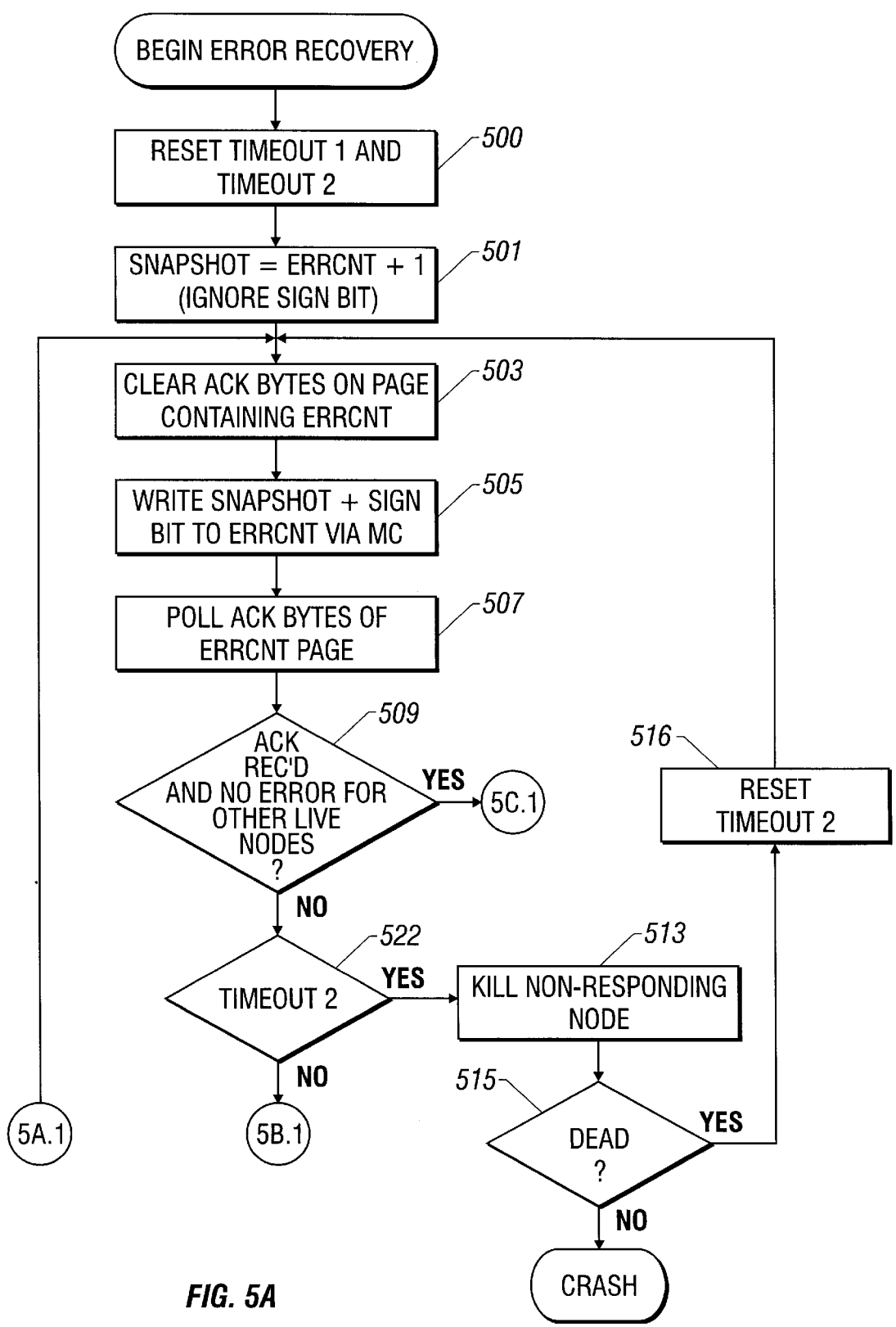
FIG. 5A is a flowchart depicting an embodiment of a network error recovery program according to the present invention.
Figure 5B:
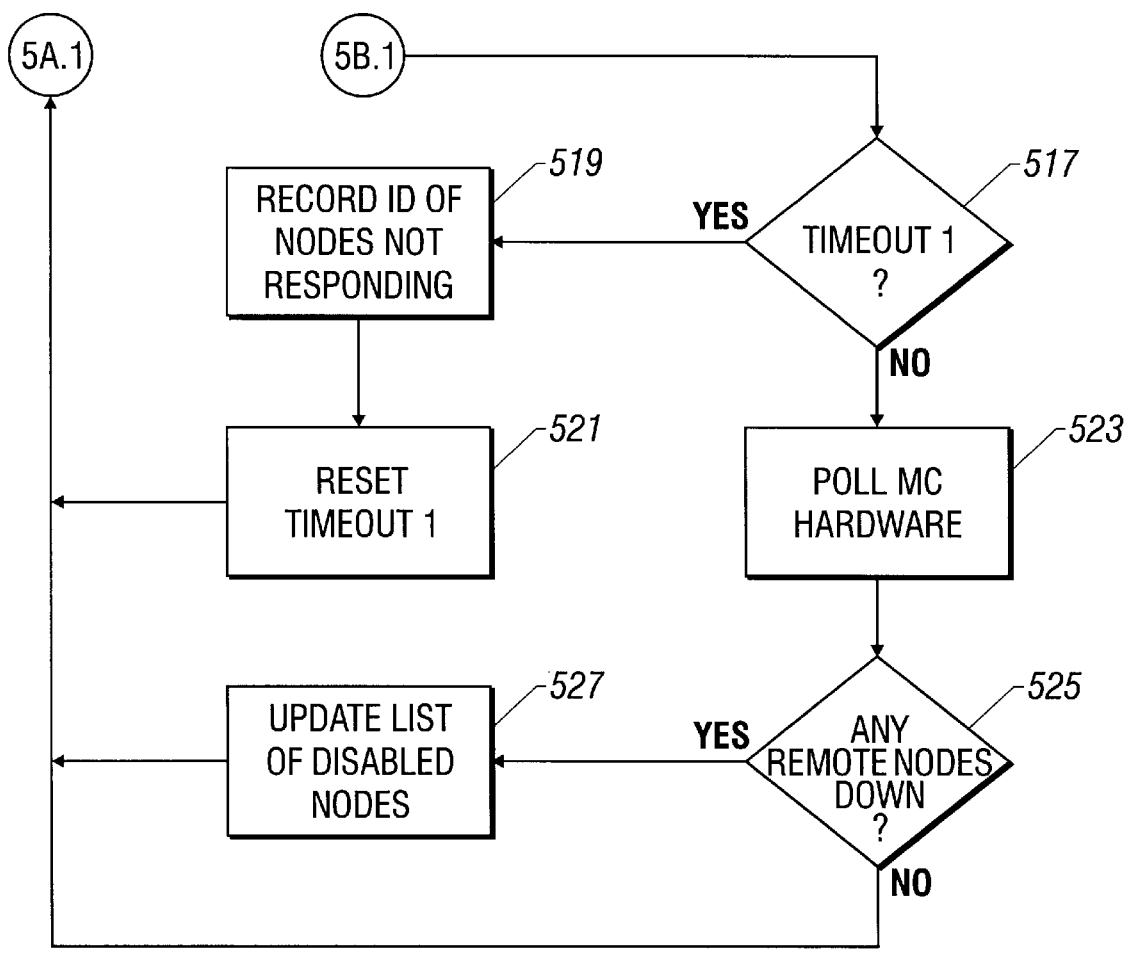
FIG. 5B is a flowchart depicting an embodiment of a network error recovery program according to the present invention.
Figure 5C:
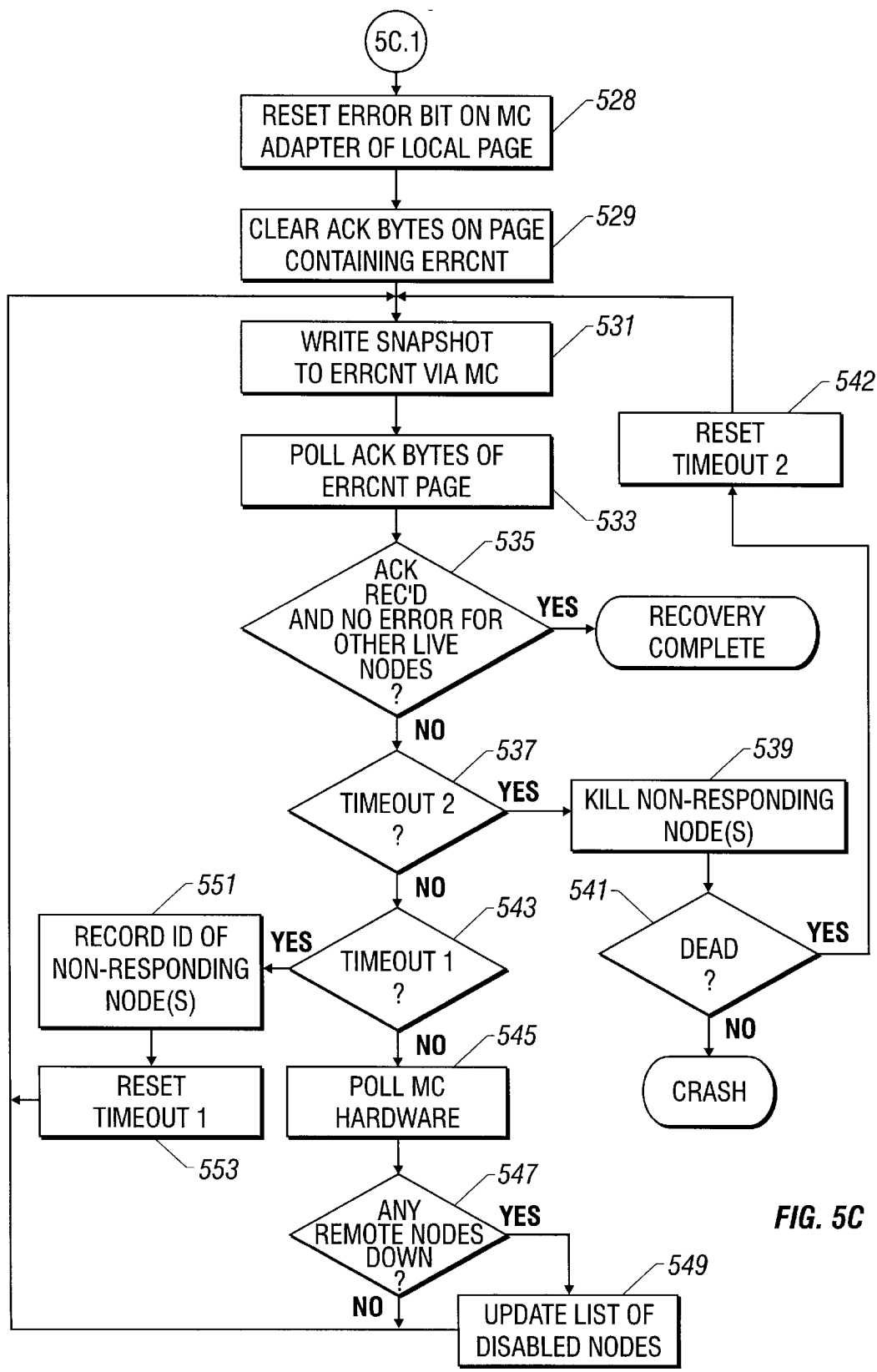
FIG. 5C is a flowchart depicting an embodiment of a network error recovery program according to the present invention.

As shown in FIG. 5A, after acquiring the error recovery spinlock, the timers timeout1 and timeout2 are reset (step 500), the error count (i.e. the variable "errcnt") is read, and a value "snapshot" is stored which equals errcnt+1 (step 501). In finding this sum, the sign bit of errcnt is ignored. A local write is then executed to clear the ack bytes on the page containing errcnt (step 503), after which a value equal to snapshot with the errcnt sign bit set is written to the errcnt via the MC (step 505). The local node then polls all the ack bytes of the errcnt page (step 507) and checks to determine whether an acknowledgment was received for all of the nodes believed to be operational, and whether those nodes are in an error state (step 509). If the acknowledgements are received and the responding nodes are not indicated as being in an error state, the recovery routine proceeds to step 528 (FIG. 5C), which is discussed in further detail hereinafter. If not, the routine proceeds to step 523 (FIG. 5B), if neither of the timers timeout2 or timeout1 has expired. In step 523 the MC hardware is polled to see if any additional nodes are indicated as being inoperative. If so, the routine proceeds from step 525 to step 527, where the local list of disabled nodes is updated, and control is returned to step 503 (FIG. 5A). If not, control is returned to step 503 without the list being updated.

Timeout1, having the shorter duration of the two timers, is used as a time limit for nodes to respond to the polling. The routine continues to loop through the polling steps until either all of the nodes believed to be alive have provided acknowledgments (step 509), or timeout2 expires. As shown in step 517 (FIG. 5B), if timeout1 expires before all of the acknowledgments are received, the identities of the nodes not responding are recorded in step 519 and the timer is reset in step 521. This establishes the identity of the non-reporting nodes. If timeout2 expires in step 522 (FIG. 5A) before all nodes believed to be operational have provided acknowledgments, the local node attempts to disable any nodes which have repeatedly not responded (or still show an error state) by writing to the MC suicide page of each (step 513). If the node is confirmed as being disabled during subsequent polling of the MC hardware (step 515), then timeout2 is reset in step 516, and control returns to step 503. If not, the local node crashes.

When all of the nodes believed to be functional have provided acknowledgments to the errcnt page (step 509), the node running the error recovery routine resets its error bit in step 528 (FIG. 5C), which is located on its MC adapter. The ack bytes are then cleared on the errcnt page (step 529), and snapshot is written to errcnt via the MC (step 531). The ack bytes of the errcnt page are then polled in step 533. If an acknowledgment is received for all of the nodes listed as being functional and no node indicates an error state (step 535), the recovery is complete, and the node need only release the spinlock. If acknowledgments are not provided by all of the nodes, and the timers timeout2 and timeout1 have not expired, the MC hardware is polled in step 545. If any additional nodes are reported by the hardware as being down (step 547), the local list of disabled nodes is updated in step 549, and control returns to step 531. If there are no additional nodes reported as being disabled, control returns to step 531 without the list being updated.

The routine continues to loop through the polling steps until either all of the nodes believed to be alive have provided acknowledgments, and are not indicated as being in an error state (step 535), or until timeout2 expires. As shown in step 543, if timeout1 expires before all the acknowledgments are received, the identities of the nodes not responding are recorded in step 551 and the timer is reset in step 553. This establishes the identity of the non-reporting nodes. If timeout2 expires before all nodes believed to be operational have provided acknowledgments and are not indicated as having errors, the local node attempts to disable nodes which have repeatedly failed to respond (or still show an error state) by writing to the MC suicide page of each (step 539). If the node is confirmed disabled by the MC hardware (step 541), timeout2 is reset in step 542, and control returns to step 531. If not, the local node crashes.

Figure 6:
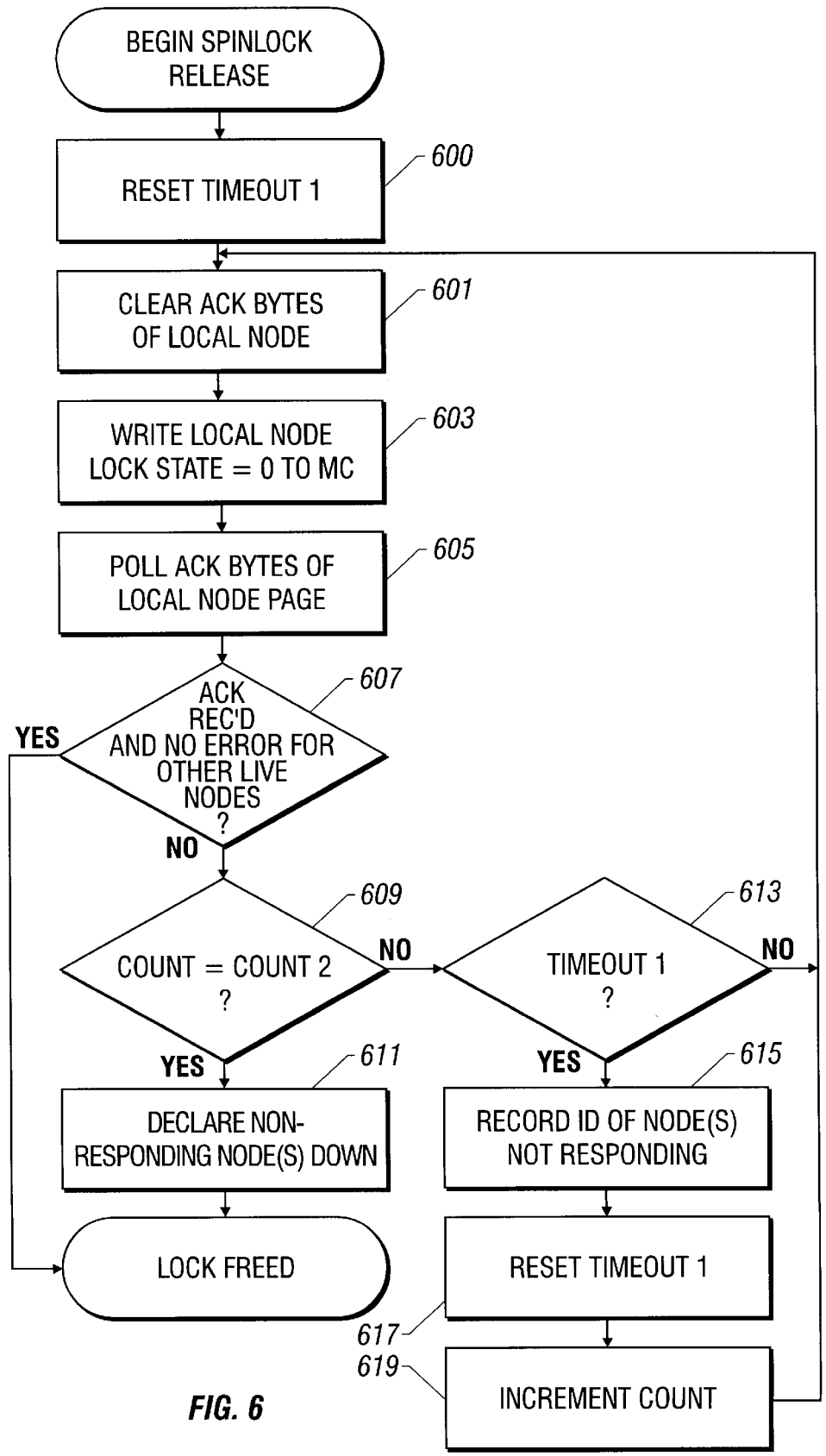
FIG. 6 is a flowchart depicting an error recovery spinlock release program according to the present invention.

As shown, the error recovery protocol will continue until either the recovery is determined to be complete, or until the routine times out and the local node crashes. If the recovery protocol is successfully run, the local node must then release the error recovery spinlock. The procedure for doing this is demonstrated in FIG. 6.

To release the error recovery spinlock, timer timeout1 is first reset (step 600) and the local node holding the lock then clears its ack bytes (step 601). The node then writes its present lock status to the MC as being equal to zero (step 603). The ack bytes of the local node are then polled (step 605). If an acknowledgment is received from each of the other nodes believed to be operational, and none of those nodes is indicated as being in an error state (step 607), the lock is determined to be freed, and the program terminates. If all the nodes believed operational do not respond, a counter is checked in step 609 to see if a preset value referred to as "count2" has been reached. If so, the unresponding nodes are declared to be disabled in step 611, the lock is determined to be freed, and the program terminates.

If count2 has not been reached, timer timeout1 is checked to see if it has expired. If it has not, control is returned to step 601. If it has, the identity of any non-responding nodes is recorded in step 615, timeout1 is reset in step 617 and the counter is incremented in step 619. Control is then returned to step 601. As can be seen, the lock is eventually freed regardless of whether some of the nodes do not report back with acknowledgments. Once free, the applications can begin to perform their own necessary recovery operations.

While the invention has been shown and described with regard to a preferred embodiment thereof, it will be understood by those skilled in the art that various changes in form and detail may be made therein without departing from the spirit and scope of the invention as defined by the appended claims.

What is claimed is:

1. A method of performing an error recovery in a shared memory network system having a plurality of individual processing nodes, the method comprising:

maintaining, at each of the processing nodes, an error count indicative of the number of errors which have been detected anywhere in the network;

acquiring, with a first one of the nodes, an error recovery spinlock providing the first node with exclusive control over data modified during the error recovery, said step of acquiring including confirming, with the first node, that no other, non-disabled nodes are attempting to acquire the spinlock, asserting control of the spinlock with the first node and confirming that the control of the spinlock is held exclusively by the first node;

incrementing the error count with the first node; and releasing the spinlock.

2. A method according to claim 1 wherein said confirming that no other, non-disabled nodes are attempting to acquire the lock comprises polling, with the first node, the other nodes of the system via the network, and receiving a reply from each of the other nodes.

3. A method according to claim 1 wherein each of the nodes maintains an indication of the lock status of each of the other nodes, the lock status indicating whether a node in question has acquired, or is attempting to acquire, the spinlock, the lock status being written from each node to the other nodes via the network.

4. A method according to claim 1 wherein acquiring control of the spinlock with the first node comprises the first node writing its lock status to the other nodes via the network indicating that it is attempting to gain exclusive control of the spinlock.

5. A method according to claim 1 wherein said confirming that the spinlock is held exclusively by the first node comprises polling, with the first node, the other nodes of the system via the network, and receiving a reply from each of the other nodes.

6. A method according to claim 1 wherein, if it is determined that a second, non-disabled node is attempting to acquire the spinlock, the method further comprises:

comparing a priority indicator of the first node with a priority indicator of the second node to determine which of the nodes has priority in aquiring the spinlock; and discontinuing any attempt by the first node to assert control of the spinlock if the priority indicators indicate that the second node has priority in acquiring the spinlock.

7. A method of performing an error recovery in a shared memory network system having a plurality of individual processing nodes, the method comprising:

maintaining, at each of the processing nodes, an error count indicative of the number of errors which have been detected anywhere in the network;

acquiring, with a first one of the nodes, an error recovery spinlock providing the first node with exclusive control over data modified during the error recovery;

incrementing the error count with the first node, the step of incrementing the error count with the first node comprises the first node writing an incremented value of the error count to the other nodes via the network; and releasing the spinlock.

8. A method according to claim 7 wherein incrementing the error count further comprises polling, with the first node, the other nodes via the network and waiting for a reply from each of the other nodes to confirm that the incremented value of the error count was received.

9. A method of performing an error recovery in a shared memory network system having a plurality of individual processing nodes, the method comprising:

maintaining, at each of the processing nodes, an error count indicative of the number of errors which have been detected anywhere in the network;

acquiring, with a first one of the nodes, an error recovery spinlock providing the first node with exclusive control over data modified during the error recovery;

incrementing the error count with the first node; and releasing the spinlock, said step of releasing the spinlock comprises the first node writing its new lock status to the other nodes via the network, the new lock status indicating that the first node no longer holds the spinlock.

10. A method according to claim 9 wherein releasing the spinlock further comprises the first node polling said other nodes via the network and waiting for a reply from each of the other nodes to confirm that the new lock status was received.

11. A method of performing an error recovery in a shared memory network system having a plurality of individual processing nodes, the method comprising:

maintaining, at each of the processing nodes, an error count indicative of the number of errors which have been detected anywhere in the network;

attempting to acquire, with a first one of said nodes, an error recovery spinlock which gives said first node exclusive control over data modified during the error recovery;

polling, with the first node, the other nodes of the system via the network, and receiving a reply from each of the other nodes to confirm, with the first node, that no other, non-disabled nodes are attempting to acquire the spinlock;

asserting control of the spinlock with the first node;

polling, with the first node, the other nodes of the system via the network, and receiving a reply from each of the other nodes to confirm that the control of the spinlock is held exclusively by the first node;

incrementing the error count with the first node by writing, with the first node, an incremented value of the error count to the other nodes via the network;

polling, with the first node, the other nodes and waiting for a reply from each of the other nodes to confirm that the incremented value of the error count was received;

releasing the spinlock by the first node writing its new lock status to the other nodes via the network, the new lock status indicating that it no longer holds the spinlock; and polling, with the first node said other nodes and waiting for a reply from each of said other nodes to confirm that the new lock status was received.

12. A computer program product for performing an error recovery in a shared memory network system having a plurality of individual processing nodes, each of the nodes maintains an indication of the lock status of each of a lock status of each of the other nodes, the lock status for each node indicating whether that node has acquired, or is attempting to acquire, a spinlock, the computer program product comprising a computer usable medium having computer readable program code thereon, the program code including:

program code for maintaining an error count indicative of the number of errors which have been detected in the network since it was last reinitialized;

program code for acquiring an error recovery spinlock which gives the first node exclusive control over data modified during the error recovery, the program code for acquiring an error recovery spinlock further comprising:

program code for polling the nodes other than the first node to confirm that no other, non-disabled node is attempting to acquire the spinlock, program code for asserting control of the spinlock by writing a lock status of the first node to the other nodes via the network which indicates that the first node is attempting to hold the spinlock, and program code for polling the nodes other than the first node to confirm that no other, non-disabled node has a lock status indicating that it is attempting to acquire the spinlock; program code for incrementing the error count; and program code for releasing the spinlock.

13. A computer program product according to claim 12 wherein the program code for aquiring an error recovery spinlock further comprises:

program code which, if it is determined that a second, non-disabled node is attempting to acquire the spinlock, compares a priority indicator of the first node with a priority indicator of the second node to determine which of the nodes has priority in aquiring the spinlock; and program code which causes any attempt by the first node to assert control of the spinlock to be discontinued if the priority indicators indicate that the second node has priority in acquiring the spinlock.

14. A computer program product for performing an error recovery in a shared memory network system having a plurality of individual processing nodes, the computer program product comprising a computer usable medium having computer readable program code thereon, the program code including:

program code for maintaining an error count indicative of the number of errors which have been detected in the network since it was last reinitialized;

program code for acquiring an error recovery spinlock which gives the first node exclusive control over data modified during the error recovery;

program code for incrementing the error count, the program code for incrementing the error count further comprises program code for writing an incremented value of the error count to nodes other than the first node via the network; and program code for releasing the spinlock.

15. A computer program product according to claim 14 wherein the program code for incrementing the error count further comprises program code for polling said other nodes, after the incremented value of the error count is written to them via the network, and waiting for a reply from each of the other nodes to confirm that the incremented value of the error count was received.

16. A computer program product for performing an error recovery in a shared memory network system having a plurality of individual processing nodes, the computer program product comprising a computer usable medium having computer readable program code thereon, the program code including:

program code for maintaining an error count indicative of the number of errors which have been detected in the network since it was last reinitialized;

program code for acquiring an error recovery spinlock which gives the first node exclusive control over data modified during the error recovery;

program code for incrementing the error count; and program code for releasing the spinlock, the program code for releasing the spinlock further comprises program code for writing a new lock status of the first node to nodes other than the first node via the network, the new lock status indicating that the first node no longer holds the spinlock.

17. A computer program product according to claim 16 wherein the program code for releasing the spinlock further comprises program code for polling said other nodes, after the new lock status is written to them via the network, and waiting for a reply from each of the other nodes to confirm that the new lock status was received.

* * * * *